United States Patent [19]
Berg et al.

[11] Patent Number: 5,818,678
[45] Date of Patent: Oct. 6, 1998

[54] TRI-STATE CONTROL APPARATUS FOR A SOLENOID HAVING ON OFF AND PWM CONTROL MODES

[75] Inventors: Robert J. Berg, Kokomo; Joseph Paul Rieder, Noblesville, both of Ind.; Dale Joseph Kumke, Brighton, Mich.

[73] Assignee: Delco Electronics Corporation, Kokomo, Ind.

[21] Appl. No.: 946,910

[22] Filed: Oct. 9, 1997

[51] Int. Cl.⁶ .................................................. H01H 47/00
[52] U.S. Cl. .......................... 361/152; 361/154; 361/170; 361/186
[58] Field of Search ................... 361/152, 154, 361/170, 186

[56] References Cited

U.S. PATENT DOCUMENTS

| | | | |
|---|---|---|---|
| 4,266,261 | 5/1981 | Streit et al. | 361/154 |
| 4,764,840 | 8/1988 | Petrie et al. | 361/154 |
| 4,825,333 | 4/1989 | Clive et al. | 361/154 |
| 4,953,056 | 8/1990 | Yakuwa et al. | 361/154 |
| 4,978,865 | 12/1990 | Hartmann et al. | 307/140 |
| 5,375,031 | 12/1994 | Mimura | 361/152 |
| 5,402,302 | 3/1995 | Boucheron | 361/169 |
| 5,748,431 | 5/1998 | Goodnight et al. | 361/154 |

*Primary Examiner*—Jeffrey A. Gaffin
*Assistant Examiner*—Kim N. Huynh

[57] ABSTRACT

A microprocessor-based control for a solenoid operated device, wherein the microprocessor employs a tri-state output to achieve fast, precise control of the device without overburdening the microprocessor. The system has three selectable control modes: a first control mode in which the solenoid is de-energized, a second control mode in which the solenoid is fully energized, and a third control mode in which the solenoid is pulse-width-modulated. The various control modes are selected by the microprocessor and indicated by the logic level of a tri-state output. In the first and second control modes, indicated by first and second logic levels, the energization state of the solenoid is controlled directly by the microprocessor. In the third control mode, indicated by a third logic level, the energization state of the solenoid is controlled by an external PWM circuit based on PWM commands supplied to the PWM circuit by the microprocessor.

6 Claims, 3 Drawing Sheets

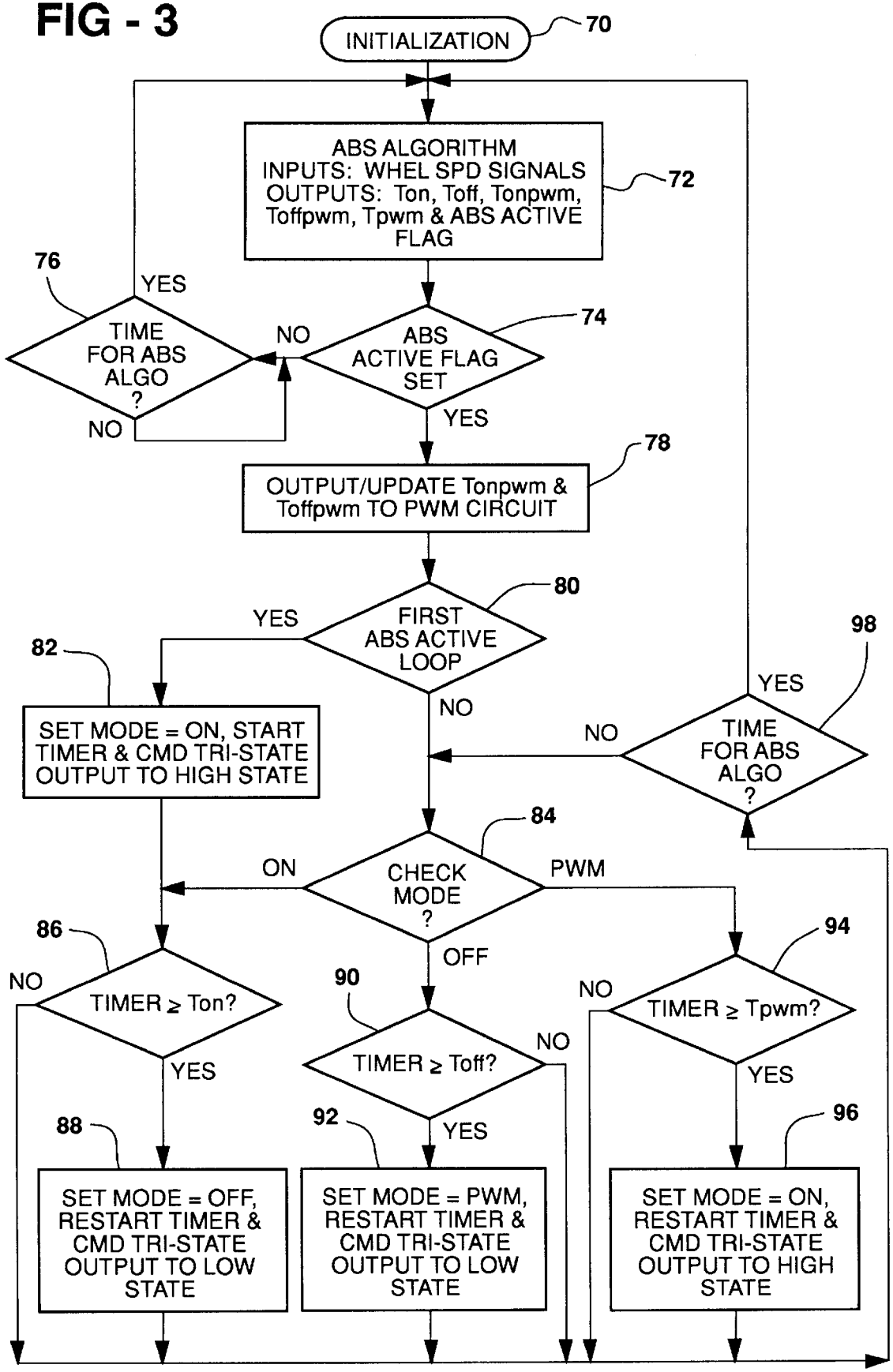

TRI-STATE CONTROL APPARATUS FOR A SOLENOID HAVING ON OFF AND PWM CONTROL MODES

This invention relates to multi-modal control of a solenoid operated device such as a fluid pressure control valve, and more particularly to a microprocessor-based control apparatus that permits fast and precise control of the solenoid-operated device without overburdening the microprocessor.

BACKGROUND OF THE INVENTION

Solenoid-operated devices such as fluid pressure control valves are commonly operated by a microprocessor-based controller as part of a larger overall control system. In an automobile, for example, solenoid operated fluid pressure control valves are used to regulate the effective brake pressure as part of an anti-lock braking control system (ABS), and to regulate a clutch apply pressure as part of an electronic transmission control system. Frequently, the control strategy requires that the device be operated in-one of three possible control modes: OFF, ON and Pulse-Width-Modulation (PWM). In an anti-lock braking system, for example, the OFF control mode can be used to release the ABS control valve to a quiescent position to permit the driver regulation of the brake pressure, the ON control mode can be used to shift the ABS control valve to an activated position for holding the brake pressure, and the PWM control mode can be used to shift the valve to an intermediate, or partially activated, position.

The frequency and/or duty cycle of the solenoid PWM are selected to achieve the desired operation of the valve. For example, the solenoid might be PWMed at a relatively low frequency to achieve a desired brake pressure, and sub-modulated at a higher frequency to reduce mechanical noise in the system due to opening and closing of the valve.

In a microprocessor-based control, it is often difficult or impossible to achieve fast and precise control of the solenoid without overburdening the microprocessor. In an ABS control, for example, the microprocessor may be responsible for performing input conditioning, control algorithm execution, output control and diagnostic functions. Accordingly, external hardware devices are frequently used to perform some or all of the PWM timing functions of the system. Even so, the time required to communicate all of the PWM command information to the external devices sometimes overburdens the processor, especially where the processor is controlling multiple solenoid operated devices, and fast, precise control is required.

SUMMARY OF THE PRESENT INVENTION

The present invention is directed to an improved microprocessor-based control apparatus for a solenoid operated device, wherein the microprocessor employs a tri-state output to achieve fast, precise control of the device without overburdening the microprocessor. The control apparatus of this invention is disclosed in the context of a system having three selectable control modes: a first control mode in which the solenoid is de-energized, a second control mode in which the solenoid is fully energized, and a third control mode in which the solenoid is pulse-width-modulated. The various control modes are selected by the microprocessor and indicated by the logic level of a tri-state output port. In the first and second control modes, indicated by first and second logic levels, the energization state of the solenoid is controlled directly by the microprocessor. In the illustrated embodiment, the first and second control modes are used for static on and off operation of the solenoid, and also for low frequency PWM of solenoid. In the third control mode, indicated by a third logic level, the energization state of the solenoid is controlled by an external PWM circuit based on PWM commands supplied to the PWM circuit by the microprocessor. In the illustrated embodiment, the third control mode is used for high frequency PWM, as sub-modulation for system noise control.

The tri-state output of the microprocessor is applied as a control mode input signal to a logic circuit. The logic circuit determines the control mode indicated by the logic level of the control mode signal, and supplies a drive signal to a solenoid driver circuit in accordance with the determined control mode. The input signal is biased to a bias voltage intermediate the first and second logic levels of the tri-state output, and the logic circuit determines the logic level of the input signal by comparing it to first and second voltage thresholds intermediate the bias voltage and the first and second logic levels, respectively. When the logic circuit identifies the first or second logic levels of the control mode input signal, it controls the solenoid driver in accordance with the control mode input signal itself. When the third logic level is identified, the logic circuit controls the solenoid driver in accordance with duty cycle control signals from the external PWM circuit. As a result, the microprocessor directly controls the static states and low frequency PWM of the solenoid, while it indirectly controls high frequency PWM of the solenoid via the external PWM circuit.

The above-described control apparatus substantially reduces the microprocessor burden while permitting fast, precise control of solenoid energization.

BRIEF DESCRIPTION OF THE DRAWINGS

FIG. 3 is a high level flow diagram representing computer program instructions executed by the microprocessor of FIG. 1 according to this invention.

DETAILED DESCRIPTION OF THE DRAWINGS

Figure 1:
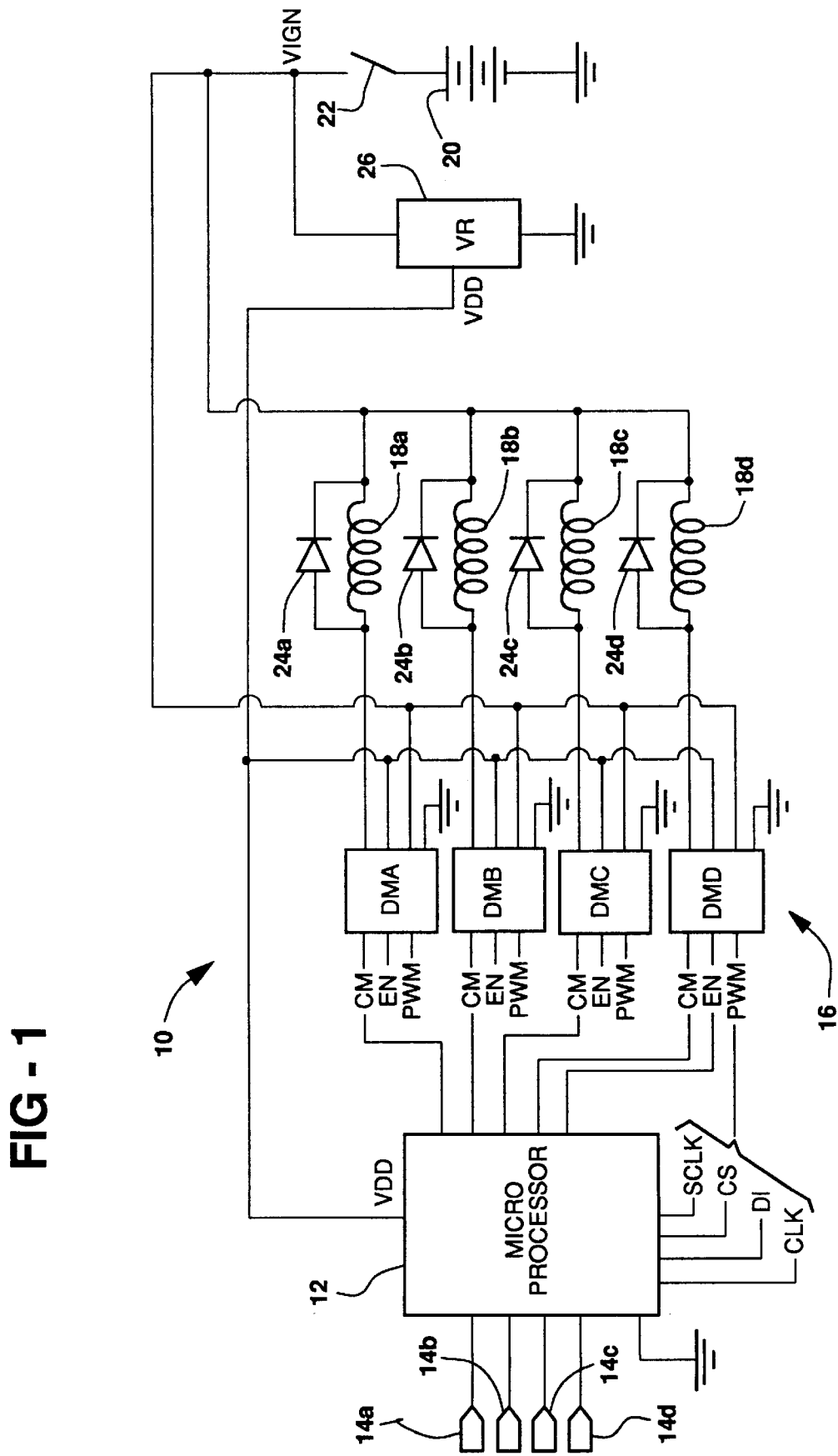
FIG. 1 is a block diagram of an ABS controller according to the present invention, including a microprocessor and an external circuit interfacing the microprocessor to a solenoid operated device.

Referring to the drawings, and particularly to FIG. 1, the reference numeral 10 generally designates an automotive ABS controller in which solenoid operated valves in each of four hydraulic brake lines are energized under the control of a microprocessor (MP) 12 for controllably adjusting the effective braking pressures to prevent wheel locking. In carrying out the control, the microprocessor 12 executes what is referred to herein as the ABS algorithm, the principle inputs for which are wheel speed signals obtained from four wheel speed sensors 14a–14d. When the algorithm detects an incipient wheel slip condition, the microprocessor 12 signals driver circuitry, generally designated by the reference numeral 16, and comprising driver modules DMA, DMB, DMC and DMD, to energize one or more of the solenoid operated valves, represented schematically by the solenoid coils 18a–18d. One terminal of each of the solenoid coils 18a–18d is connected to the positive terminal of a storage battery 20 via conventional ignition switch 22, and the other respective terminals are selectively connected to the negative terminal, or ground, by an associated driver module. Free-wheeling diodes 24a–24d connected in parallel with each of the solenoid coils 18a–18d slowly re-circulate inductive energy stored in the respective coils when the associated driver module interrupts the ground connection to de-energize the coil.

The storage battery voltage VIGN is supplied to each of the driver modules DMA, DMB, DMC and DMD, and a lower logic-level voltage VDD developed by voltage regulator, (VR) 26 is supplied to both the microprocessor 12 and the driver modules DMA, DMB, DMC and DMD. The inputs supplied to driver modules DMA, DMB, DMC and DMD by microprocessor 12 include a control mode signal (CM), an enable signal (EN) and PWM control signals (PWM). As indicated in respect to driver module DMD, the PWM control signals include a serial-clock signal (SCLK), a chip select signal (CS), a data input (DI) signal and a PWM clock signal (CLK). These signals are discussed in further detail below in reference to FIG. 2, which depicts a block diagram of exemplary driver module DMD.

In the illustrated embodiment, the ABS algorithm executed by microprocessor 12 employs a relatively low frequency pulse-width-modulation (PWM) of the solenoid coils 18a–18d to establish desired effective braking pressures in each of the four brake lines. Additionally, the solenoids are PWMed at a much higher frequency during a portion of each low frequency PWM cycle in order to keep the respective valves partially open, which minimizes mechanical and/or hydraulic system noise. This control strategy is graphically illustrated in FIG. 4D, where each pulse indicates solenoid energization. Each cycle of the low frequency PWM begins at time t0 and ends at time tn. In the interval t0–t1, the solenoid is fully energized to close the respective valve to quickly prevent further increase in the braking pressure. In the interval t1–t2, the solenoid is de-energized to allow the valve to return to a near-full-open position, and in the ensuing interval t2–tn, the solenoid is modulated with a relatively high frequency PWM for maintaining the valve in the near-full-open position. This control strategy is the subject of U.S. patent application Ser. No. 08/946,909, assigned to General Motors Corporation.

For purposes of this invention, which is not limited to the above described algorithm, the required control is considered to consist of three separate control modes: an ON mode typified by the interval t0–t1, an OFF mode typified by the interval t1–t2, and a PWM mode typified by the interval t2–tn. The microprocessor 12 can easily handle the static and low frequency switching requirements of the ON and OFF modes, but is unduly burdened by directly controlling the high frequency switching of the PWM mode. According to this invention, the microprocessor 12 selects a solenoid mode based on the ABS algorithm, and utilizes a tri-state control mode output (CM) to indicate the selected mode to the respective driver module. The driver modules interpret their control mode signal, and energize the respective solenoids in accordance with (1) the control mode signal itself when the ON or OFF modes are indicated, and (2) a control signal supplied by an external PWM circuit when the PWM mode is indicated. Periodically in the course of the ABS cycle, the microprocessor 12 updates the PWM control information supplied to the external PWM circuit, but the burden of directly controlling the high frequency switching is relieved without degrading the responsiveness and accuracy of the control.

Figure 2:
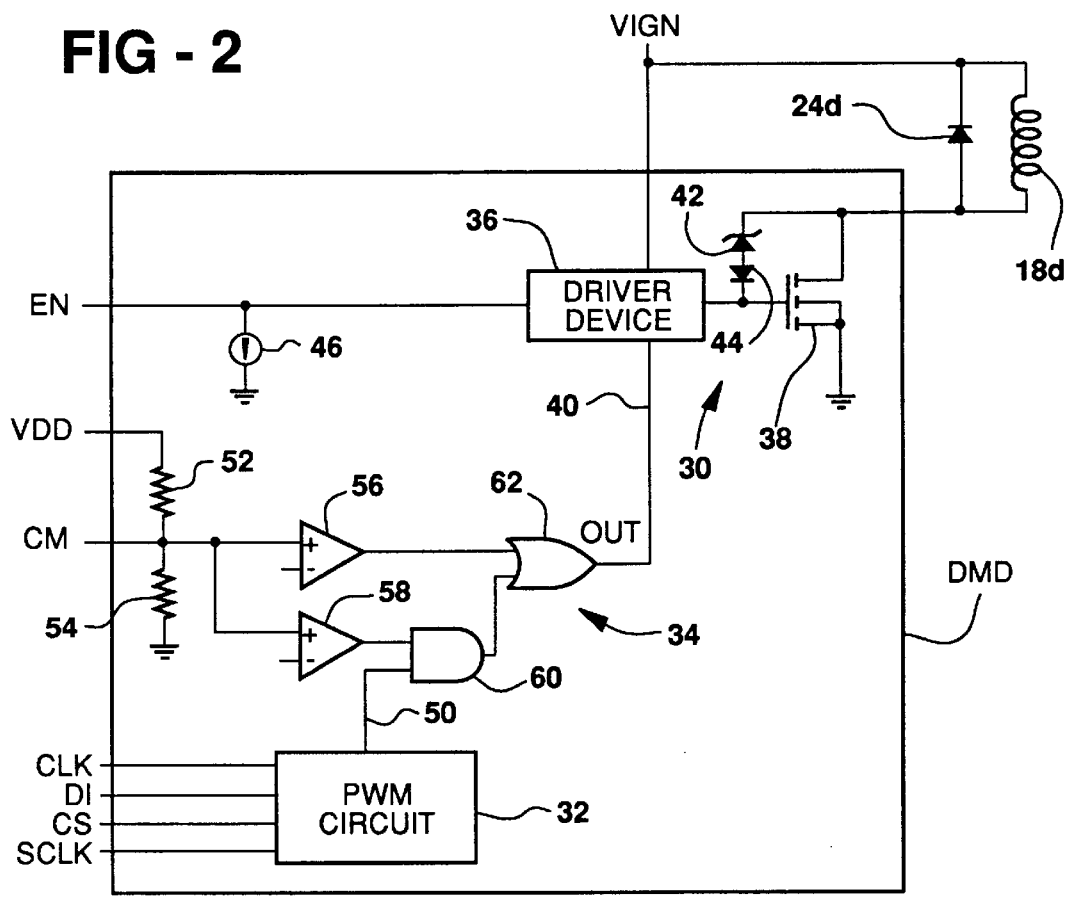
FIG. 2 is a block diagram of the external circuit of FIG. 1, depicting a PWM circuit, a logic circuit and a solenoid driver circuit.

FIG. 2 details a representative driver module DMD of FIG. 1, where like reference numerals designate like elements where possible. The driver module DMD comprises an output driver circuit, generally designated by the reference numeral 30, a PWM circuit 32 and a logic circuit, generally designated by the reference numeral 34.

The output driver circuit includes a driver device 36 which operates, when enabled by enable signal EN, to bias power transistor 38 on and off in accordance with the logic level of the logic circuit output (OUT) on line 40. The series combination of zener diode 42 and diode 44 in the drain-to-gate circuit of transistor 38 provide a controlled turn-off of the transistor so as to limit the inductive voltage when solenoid 18d is de-energized in the event that diode 24d fails to a open-circuit state. The driver device 36 may be of conventional design and is not illustrated in detail. The current source 46 ensures that the driver device 36 is maintained in a disabled state in the absence of an enable signal EN from microprocessor 12.

The PWM circuit 32 may be a conventional digital PWM circuit having a pair of internal registers which are periodically updated by microprocessor 12 with frequency and duty cycle information. In the illustrated embodiment, microprocessor 12 periodically sends PWM-mode on-time and period data to the PWM circuit 32. The data is supplied serially via the data input (DI) line, and clocked into the internal registers of PWM circuit 32 via clock pulses provided on the serial-clock (SCLK) line. The data stored in the registers represents a number of clock pulses or counts of the high frequency clock (CLK) line. Whenever enabled by the chip select (CS) line, the PWM circuit 32 provides a digital output, such as illustrated in the interval t2–tn of FIG. 4B, on its output line 50. In the illustrated embodiment, each driver module has a similar PWM circuit, and the microprocessor 12 periodically updates the high frequency information stored in each circuit, per dictate of the ABS algorithm.

The logic circuit 34 receives the tri-state control mode signal (CM) from microprocessor 12, and the digital output of PWM circuit 32 on line 50. A pair of equal value resistors 52 and 54 bias the normal or open-circuit voltage of the control mode signal to the mid-point of the logic level voltage VDD. The microprocessor 12, which operates on the logic level voltage, can selectively (1) drive the control mode signal to a high logic level, over-powering the pull-down resistor 54, (2) drive the control mode signal to a low logic level, over-powering the pull-up resistor 52, or (3) present a high impedance, allowing the resistors 52 and 54 to maintain the control mode signal voltage at 0.5 VDD when the impedance values of the resistors 52 and 54 are substantially less than the high impedance.

The control mode signal is applied to the non-inverting inputs of comparators 56 and 58. A reference voltage of 0.75 VDD is applied to the inverting input of comparator 56, and a reference voltage of 0.25 VDD is applied to the inverting input of comparator 58. The output of comparator 58 is applied, along with the digital output of PWM circuit 32, as inputs to AND-gate 60, and the outputs of AND-gate 60 and comparator 56 are applied as inputs to OR-gate 62 to form the output signal OUT on line 40.

When the microprocessor 12 selects the OFF mode, it drives the control mode signal (CM) to a low logic level, below the reference of 0.25 VDD. In this case, the outputs of both comparators 56 and 58 are low, blocking the PWM pulses on line 50 and forcing the output signal (OUT) on line 40 to a low logic level, de-energizing solenoid 18d.

When the microprocessor 12 selects the ON mode, it drives the control mode signal to a high logic level, above the reference of 0.75 VDD. In this case, the output of comparator 56 is high, forcing the output signal (OUT) on line 40 to a high logic level, energizing solenoid 18*d*.

When the microprocessor 12 selects the PWM mode, it drives its control mode (CM) output to a high impedance state, allowing the resistors 52 and 54 to bias the signal to 0.50 VDD, intermediate the reference voltages of 0.25 VDD and 0.75 VDD. In this case, the output of comparator 56 is low, and the output of comparator 58 is high, allowing the digital output of PWM circuit 32 to pass through both AND-gate 60 and OR-gate 62 to the output signal (OUT) line 40.

Figure 4A:
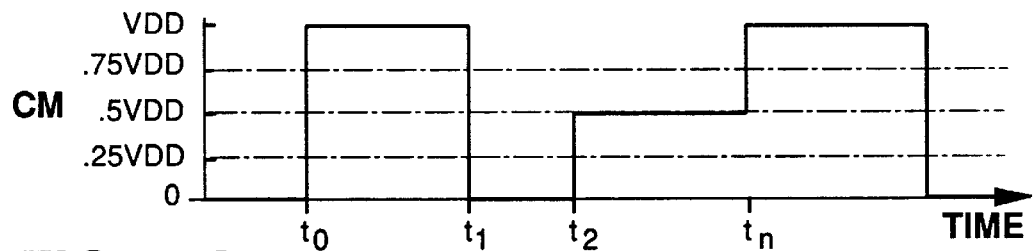
FIGS. 4A and 4B together graphically depict the solenoid control effected by the ABS system of FIG. 1.
Figure 4B:
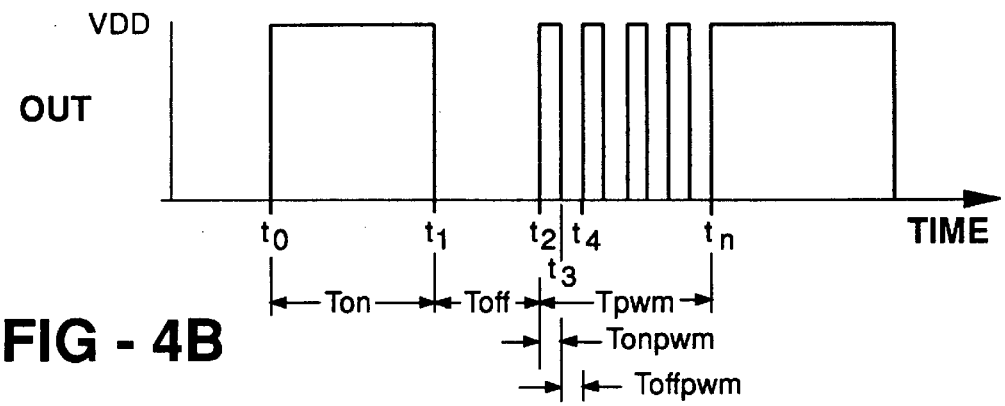

It will thus be seen that the logic circuit 34 works in concert with the tri-state control mode output of microprocessor 12 to identify the selected control mode, to control the solenoid energization in accordance with the control mode signal itself when the ON or OFF modes are selected, and to control the solenoid energization in accordance with the output of the PWM circuit 32 when the PWM mode is selected. This operation is graphically depicted in FIGS. 4A–4B; where FIG. 4A depicts the control mode signal (CM), and FIG. 4B depicts the logic circuit output signal (OUT), on a common time base. The throughput burden of the microprocessor is relieved because it only has to update the high frequency PWM information, and output port utilization is increased because the tri-state output is used for the double purpose of indicating the selected mode and controlling the solenoid energization in two of the modes.

FIG. 3 depicts a simplified flow diagram representative of computer program instructions executed by microprocessor 12 in carrying out the above-described control. The block 70 designates a set of instructions for initializing the various parameters and variables at start-up, enabling the driver modules, and performing self-testing to ensure reliable operation of the system. After initialization, the block 72 is executed to carry out the main ABS algorithm. As indicated above, the ABS algorithm, which is essentially unrelated to the present invention, reads and analyzes the wheel speed data from sensors 14*a*–14*d* to detect the onset of wheel slip, sets or clears an ABS ACTIVE FLAG to indicate whether the ABS system is to be activated, and generates suitable energization commands for the solenoids 18*a*–18*d* when appropriate. As noted in the flow diagram, the outputs include, for each solenoid 18*a*–18*d*, the low frequency on and off times (Ton and Toff), the duration of the high frequency PWM (Tpwm), and the high frequency on and off times (Tonpwm and Toffpwm); such outputs are graphically defined in FIG. 4B.

Prior to the onset of wheel slip, the ABS mode is considered to be inactive, as determined at block 74, and block 76 is executed to determine if it is time to re-execute the ABS algorithm. Typically, automotive controllers are designed to so that algorithms such as the ABS algorithm are executed on a periodic basis, such as once every 100 μsec. At the appropriate time, block 76 is answered in the affirmative, and the ABS algorithm is re-executed.

Once the ABS algorithm sets the ABS flag to indicate that the ABS mode is active, the blocks 78–96 are executed to output or update the high frequency on and off times Tonpwm and Toffpwm to the various PWM circuits 32 (block 78), and for any solenoid for which ABS is active, to control the logic level of the respective tri-state outputs, and hence the control mode signals (blocks 80–96). After each loop, the block 98 is executed to determine if it is time to re-execute the ABS algorithm. If so, the microprocessor 12 is returned to block 72, as described above. If not, the microprocessor 12 is directed to block 84 to re-execute the tri-state output control portion of the flow diagram.

In the first program loop after the ABS ACTIVE FLAG has been set, as determined at block 80, the block 82 is executed to set a control mode indicator (MODE) to ON, to start a timer or counter (TIMER), and to command the respective tri-state output to its HIGH state. In subsequent executions of the program loop while the ABS ACTIVE FLAG is set, block 80 will be answered in the negative, and block 84 will be executed to determine the state of the MODE indicator. Initially, the MODE indicator will be ON, and the block 86 is executed to determine if the TIMER has reached Ton. If not, the block 98 is executed as described above to determine if it is time to re-execute the ABS algorithm. If block 86 is answered in the affirmative, block 88 is executed to set the MODE indicator to OFF, to restart the TIMER, and to command the respective tri-state output to its LOW state. In a subsequent execution of the program loop when block 84 determines that the MODE indicator is OFF, the block the block 90 is executed to determine if the TIMER has reached Toff. If not, the block 98 is executed as described above to determine if it is time to re-execute the ABS algorithm. If block 90 is answered in the affirmative, block 92 is executed to set the MODE indicator to PWM, to restart the TIMER, and to command the respective tri-state output to its HIGH-Z, or high impedance, state. In a subsequent execution of the program loop when block 84 determines that the MODE indicator is PWM, the block the block 94 is executed to determine if the TIMER has reached Tpwm. If not, the block 98 is executed as described above to determine if it is time to re-execute the ABS algorithm. If block 94 is answered in the affirmative, block 96 is executed to set the MODE indicator back to ON, to restart the TIMER, and to command the respective tri-state output back to its HIGH state.

It will be appreciated, of course, that the above-described flow diagram is meant to illustrate the operation of the microprocessor 12, and is presented in a simplified format designed to communicate the information relevant to the present invention. The circuitry of FIGS. 1–2 responds to the logic level or state of the various tri-state outputs as described above to control the solenoids 18*a*–18*d* in accordance with the outputs of the ABS algorithm. The use of the tri-state logic level outputs of microprocessor 12 provides fast and precise energization of the solenoids while reducing the microprocessor throughput burden. The microprocessor itself handles the static and low frequency solenoid commands via the ON and OFF states of the tri-state outputs, and uses the third, or high impedance, state to signal the logic circuit 34 to control high frequency activation of the solenoids based on PWM data periodically sent to an external PWM circuit 32.

While this invention has been described in reference to the illustrated embodiment, it is expected that various modifications in addition to those suggested above will occur to those skilled in the art. In this regard, it will be understood that the scope of this invention is not limited to the illustrated embodiment, and that systems incorporating such modifications may fall within the scope of this invention, which is defined by the appended claims.

We claim:

1. Control apparatus for controlling a solenoid-operated device in a system having three selectable control modes including a first control mode in which the solenoid is de-energized, a second control mode in which the solenoid is fully energized, and a third control mode in which the solenoid is pulse-width-modulated, the control apparatus comprising:

a system processor for selecting a control mode from among said first, second and third control modes, and developing a control mode signal having a logic level indicative of the selected control mode;

an output driver circuit including a transistor switch for selectively coupling the solenoid to a power source in accordance with a drive signal applied thereto;

a PWM circuit connected to receive a PWM command from said system processor, and for developing PWM duty cycle control signals based on the received PWM command; and a logic circuit connected to receive the control mode signal from said system processor and said duty cycle control signals from said PWM circuit, for determining the control mode indicated by the logic level of said control mode signal, and for supplying a drive signal to said output driver circuit in accordance with the determined control mode.

2. The control apparatus of claim 1, wherein said system processor and logic circuit are coupled to a first and second logic level voltages, and wherein:

the control mode signal developed by said system processor has a first logic level defined by the first logic level voltage, a second logic level defined by the second logic level voltage, and a third logic level defined by a high impedance;

the control mode signal developed by said system processor is applied to an input line of said logic circuit; and said logic circuit includes a bias circuit for biasing said input line to a bias voltage intermediate said first and second logic level voltages when said control mode signal has said third logic level, and a comparator circuit for comparing said control mode signal to first and second threshold voltages intermediate said bias voltage and said first and second logic level voltages, respectively, to determine the selected control mode.

3. The control apparatus of claim 2, wherein said bias circuit comprises first and second resistors coupling said input line to said first and second logic level voltages, respectively, said first and second resistors having impedance values substantially less than said high impedance.

4. The control apparatus of claim 1, wherein:

the control mode signal developed by said system processor has a first logic level indicative of the first control mode, a second logic level indicative of the second control mode and a third logic level indicative of the third control mode; and the drive signal supplied to said driver circuit by said logic circuit engages said first control mode to de-energize said solenoid when the control mode signal has said first logic level, engages said second control mode to fully energize said solenoid when the control mode signal has said second logic level, and engages said third control mode to pulse-width-modulate said solenoid with the PWM duty cycle control signals developed by said PWM circuit when the control mode signal has said third logic level.

5. The control apparatus of claim 4, wherein said system processor and logic circuit are coupled to first and second logic level voltages, and wherein:

the control mode signal developed by said system processor has a first logic level defined by the first logic level voltage, a second logic level defined by the second logic level voltage, and a third logic level defined by a high impedance;

the control mode signal developed by said system processor is applied to an input line of said logic circuit; and said logic circuit includes a bias circuit for biasing said input line to a bias voltage intermediate the first and second logic level voltages when said control mode signal has said third logic level, and a comparator circuit for comparing said control mode signal to first and second threshold voltages intermediate said bias voltage and said first and second logic level voltages, respectively, to determine the selected control mode.

6. The control apparatus of claim 5, wherein said bias circuit comprises first and second resistors coupling said input line to said first and second logic level voltages, respectively, said first and second resistors having impedance values substantially less than said high impedance.

* * * * *